UNITED STATES PATENT OFFICE.

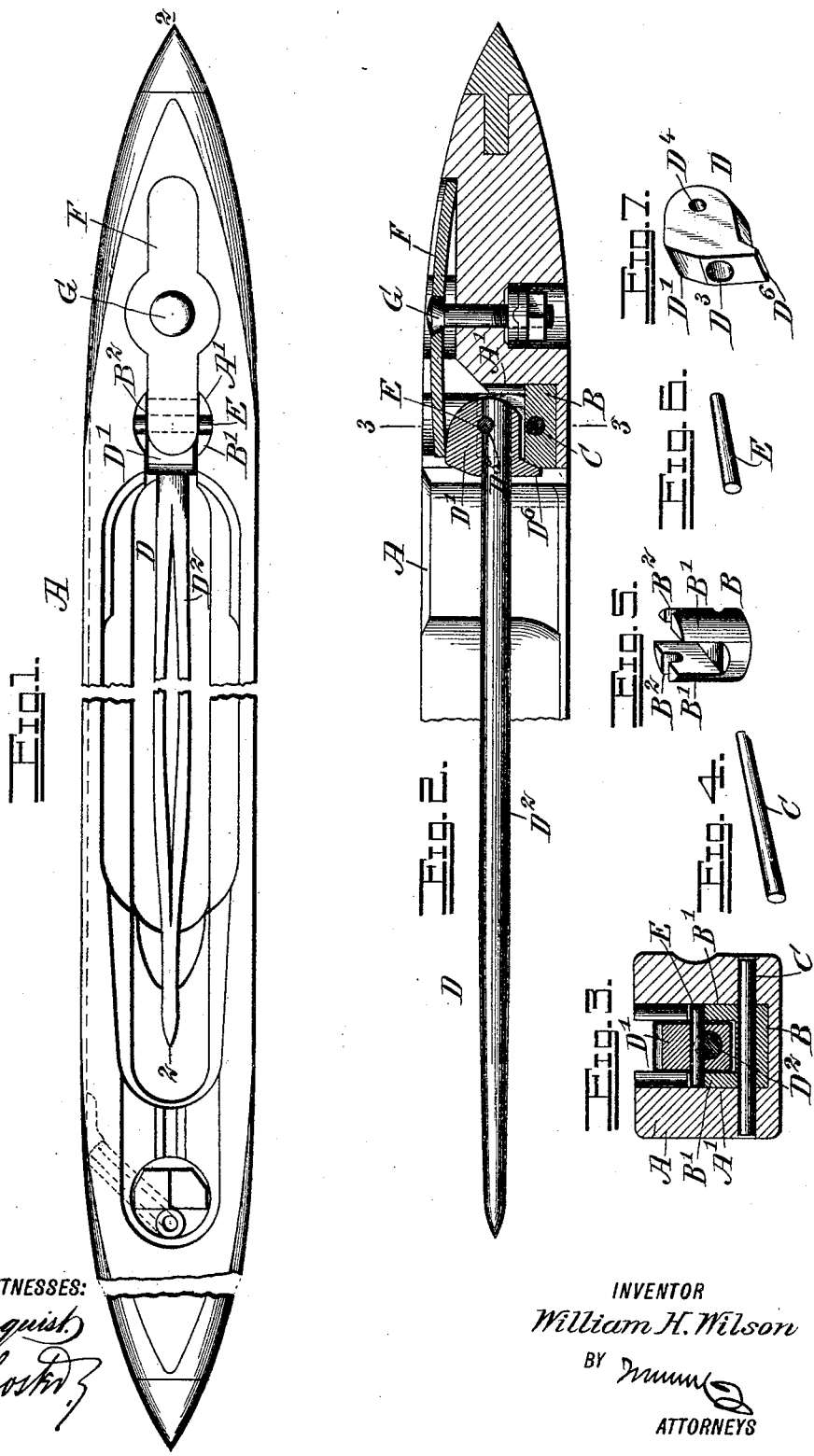

WILLIAM H. WILSON, OF NEW BEDFORD, MASSACHUSETTS.

LOOM-SHUTTLE.

No. 814,494. Specification of Letters Patent. Patented March 6, 1906.

Application filed March 10, 1905. Serial No. 249,475.

*To all whom it may concern:*

Be it known that I, WILLIAM H. WILSON, a citizen of the United States, and a resident of New Bedford, in the county of Bristol and State of Massachusetts, have invented a new and Improved Loom-Shuttle, of which the following is a full, clear, and exact description.

The invention relates to weaving; and its object is to provide a new and improved loom-shuttle having a spindle arranged to prevent undue wear and sidewise vibration and consequent breaking of the thread and to allow convenient renewal of a spindle-shank when broken or otherwise injured.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a plan view of the improvement. Fig. 2 is an enlarged sectional side elevation of the same on the line 2 2 of Fig. 1. Fig. 3 is a transverse section of the same on the line 3 3 of Fig. 2. Fig. 4 is a perspective view of the pin for fastening the bearing in the shuttle-body. Fig. 5 is a perspective view of the bearing. Fig. 6 is a perspective view of the pivot-pin for the shuttle-spindle, and Fig. 7 is a perspective view of the spindle-head.

In one end of the body A of the loom-shuttle is formed a recess or seat A' for the reception of a metallic bearing B, removably secured in position in the said seat A' by a transverse pin C, extending through the base of the bearing and the sides of the shuttle-body A, as plainly shown in Fig. 3. The bearing B is provided with integral spaced rising lugs B', between which fits the head D' of a spindle D, having the base end of its shank $D^2$ fitting into an aperture $D^3$, arranged lengthwise in the said head D', the said base end of the shank $D^2$ being removably secured to the said head D' by a pin E, extending transversely through an aperture $D^4$ in the head D' and through a notch $D^5$, formed on the top of the base end of the shank $D^2$. The ends of the pin E extend beyond the sides of the head D' to engage notches $B^2$, formed in the top of the lugs B' of the bearing B, so that the pin E, besides fastening the shank $D^2$ to the head D', also forms the pivot for the spindle to swing on the bearing B. The head D' of the spindle D is pressed on at the top in the usual manner by a spring F, engaged by a bolt G for holding the spring in place and adjusting the tension thereof in the usual manner.

In practice the bearing B, spindle D, and the pins C and E are preferably made of hardened steel, so that the wear of the contacting parts is reduced to a minimum and a long life of the loom-shuttle is insured, and in addition sidewise vibration of the spindle D is prevented, as the head D' fits snugly between the lugs B', and the said head can be hardened independently of the shank. $D^2$ In case it is desired to renew the spindle-shank $D^2$ in case the latter is broken or otherwise injured it is only necessary for the operator to remove the spring F and then lift the spindle out of the shuttle and then to drive the pin E out of the head D' to disconnect the shank $D^2$ from the head D' and to allow the insertion of a new shank, fastened in place in the head D' by reinserting the pin E. The spindle is then again placed in position on the bearing B, after which the spring F is replaced, and the shuttle is again ready for use.

The head D' of the shuttle-spindle is provided with the usual heel $D^6$, abutting against the front end of the bearing D to hold the shank $D^2$ of the spindle in proper longitudinal position.

Having thus described my invention, I claim as new and desire to secure by Letters Patent—

1. A loom-shuttle provided with a spindle comprising a shank, a removable head for the shank, and a pivot-pin for the spindle, the said pin also serving to fasten the shank in place in the head.

2. A loom-shuttle comprising a body provided with a recess, a bearing fitting in said recess and provided with spaced lugs, means for removably securing the bearing in place, a spindle having a shank, a head on said shank fitting between the lugs and mounted to turn thereon, the said head having a heel engaging the front of the bearing, a spring pressing on the head of the spindle to hold it in position in the bearing, and means for holding the spring in place and adjusting the tension thereof.

3. A loom-shuttle comprising a body, a bearing removably held in the said body, a spindle having a shank provided with a transverse notch at its base end, a head having an aperture for receiving the base end of the shank, and a pivot-pin for the spindle, mounted to turn on said bearing, the said pin being held in the head and engaging the said notch in the shank to fasten the shank in place in the head.

4. A loom-shuttle comprising a body, a bearing fitting into a recess in the said body and provided with spaced lugs, a pin extending through the bearing and the sides of the shuttle-body, for removably securing the bearing in place, a spindle having a shank, a head, and a pivot-pin, the latter fastening the shank in place in the said head and mounted to turn on the said lugs.

5. A loom-shuttle comprising a body provided with a bearing, a spindle having a shank, a removable head, and a pivot-pin, the said pivot-pin fastening the shank in place in the said head and mounted to turn on the said bearing.

In testimony whereof I have signed my name to this specification in the presence of two subscribing witnesses.

WILLIAM H. WILSON.

Witnesses:
　ALEXANDER D. TABER,
　JOHN H. CLIFFORD.